(12) United States Patent
Pongsajapan

(10) Patent No.: US 7,680,891 B1
(45) Date of Patent: Mar. 16, 2010

(54) CAPTCHA-BASED SPAM CONTROL FOR CONTENT CREATION SYSTEMS

(75) Inventor: John Pongsajapan, Pasadena, CA (US)

(73) Assignee: Google Inc., Mountain View, CA (US)

( * ) Notice: Subject to any disclaimer, the term of this patent is extended or adjusted under 35 U.S.C. 154(b) by 321 days.

(21) Appl. No.: 11/425,118

(22) Filed: Jun. 19, 2006

(51) Int. Cl.
*G06F 15/16* (2006.01)

(52) U.S. Cl. .............. 709/206; 709/217; 709/218; 709/219; 709/223; 709/225; 709/226

(58) Field of Classification Search ........... 709/206, 709/217, 218, 219, 223, 225, 226
See application file for complete search history.

(56) References Cited

U.S. PATENT DOCUMENTS

| 6,161,130 | A | 12/2000 | Horvitz et al. | 709/206 |
|---|---|---|---|---|
| 6,195,698 | B1 | 2/2001 | Lillibridge et al. | 709/225 |
| 6,199,102 | B1 | 3/2001 | Cobb | 709/206 |
| 7,139,740 | B2 * | 11/2006 | Ayala | 706/26 |
| 2004/0003283 | A1 | 1/2004 | Goodman et al. | 713/201 |
| 2004/0177110 | A1 | 9/2004 | Rounthwaite et al. | 709/202 |
| 2004/0199597 | A1 * | 10/2004 | Libbey et al. | 709/207 |
| 2005/0021649 | A1 | 1/2005 | Goodman et al. | 709/207 |
| 2005/0044154 | A1 | 2/2005 | Kaminski et al. | 709/206 |
| 2005/0044155 | A1 | 2/2005 | Kaminski et al. | 709/206 |
| 2005/0204005 | A1 | 9/2005 | Purcell et al. | 709/206 |
| 2005/0229251 | A1 * | 10/2005 | Chellapilla et al. | 726/23 |
| 2005/0262210 | A1 | 11/2005 | Yu | 709/206 |
| 2006/0195604 | A1 * | 8/2006 | Goodman et al. | 709/232 |
| 2006/0286530 | A1 * | 12/2006 | Forrest et al. | 434/323 |

OTHER PUBLICATIONS

Von Ahn, L., et al., "Telling Humans and Computers Apart Automatically," Communications of the ACM, vol. 47, No., Feb. 2004.
Von Ahn, L., et al., "CAPTCHA: Using Hard AI Problems for Security," Lecture Notes in Computer Science, vol. 2656, Jan. 2003, pp. 294-311.

* cited by examiner

*Primary Examiner*—Liangche A Wang
(74) *Attorney, Agent, or Firm*—Morgan, Lewis & Bockius LLP

(57) ABSTRACT

Methods and systems of spam control for content creation systems include evaluation of documents created by a creator for characteristics associated with spam. A challenge rate is determined based on the evaluation. Whenever the creator attempts to create a document, he may be presented a challenge in accordance with the challenge rate. The challenge rate may be adjusted based on the creator's response to the challenge.

17 Claims, 7 Drawing Sheets

US 7,680,891 B1

CAPTCHA-BASED SPAM CONTROL FOR CONTENT CREATION SYSTEMS

TECHNICAL FIELD

The disclosed embodiments relate generally to content creation systems, and more particularly, to methods and systems of controlling spam via CAPTCHAs or other challenges for verifying that a content creator is human.

BACKGROUND

Internet tools such as email, weblogs (blogs), and message boards have grown to become important tools of electronic communication. The growth of these tools, however, has also led to the growth of unsolicited electronic communications known as spam. Spam is disliked by many users and administrators of these communication tools for intruding upon users' privacy and potentially compromising security.

Spam can be controlled at the recipient side or at the creator side. Ways of controlling spam at the creator side include banning users, throttling the number of messages or posts that can be sent or posted, or presenting challenges to verify that the creator of a message is human. Sometimes, these methods can be applied too aggressively, due to uncertainty regarding whether the content in question is spam; the control measures are applied to legitimate users as well as spammers. This can have the effect of inconveniencing legitimate users and making the user experience less productive and enjoyable.

SUMMARY

In accordance with some embodiments, a method of controlling spam includes determining, for a set of documents created by a creator, a degree to which the set of documents includes spam; determining a challenge rate associated with the creator based on the determined degree to which the set of documents includes spam; and presenting to the creator a challenge in accordance with the challenge rate whenever the creator attempts to create a document.

In accordance with some embodiments, a method of controlling spam includes determining, for a set of documents created by a creator, a metric whose value indicates an extent to which the set of documents have characteristics associated with spam; determining a challenge rate associated with the creator based on the determined metric; and presenting to the creator a challenge in accordance with the challenge rate whenever the creator attempts to create a document.

In accordance with some embodiments, instructions to perform the aforementioned operations may be included in one or more modules stored in memory and configured for execution by one or more processors.

In accordance with some embodiments, instructions for performing the aforementioned operations may be included in a computer program product.

BRIEF DESCRIPTION OF THE DRAWINGS

Like reference numerals refer to corresponding parts throughout the drawings.

DESCRIPTION OF EMBODIMENTS

Figure 1:
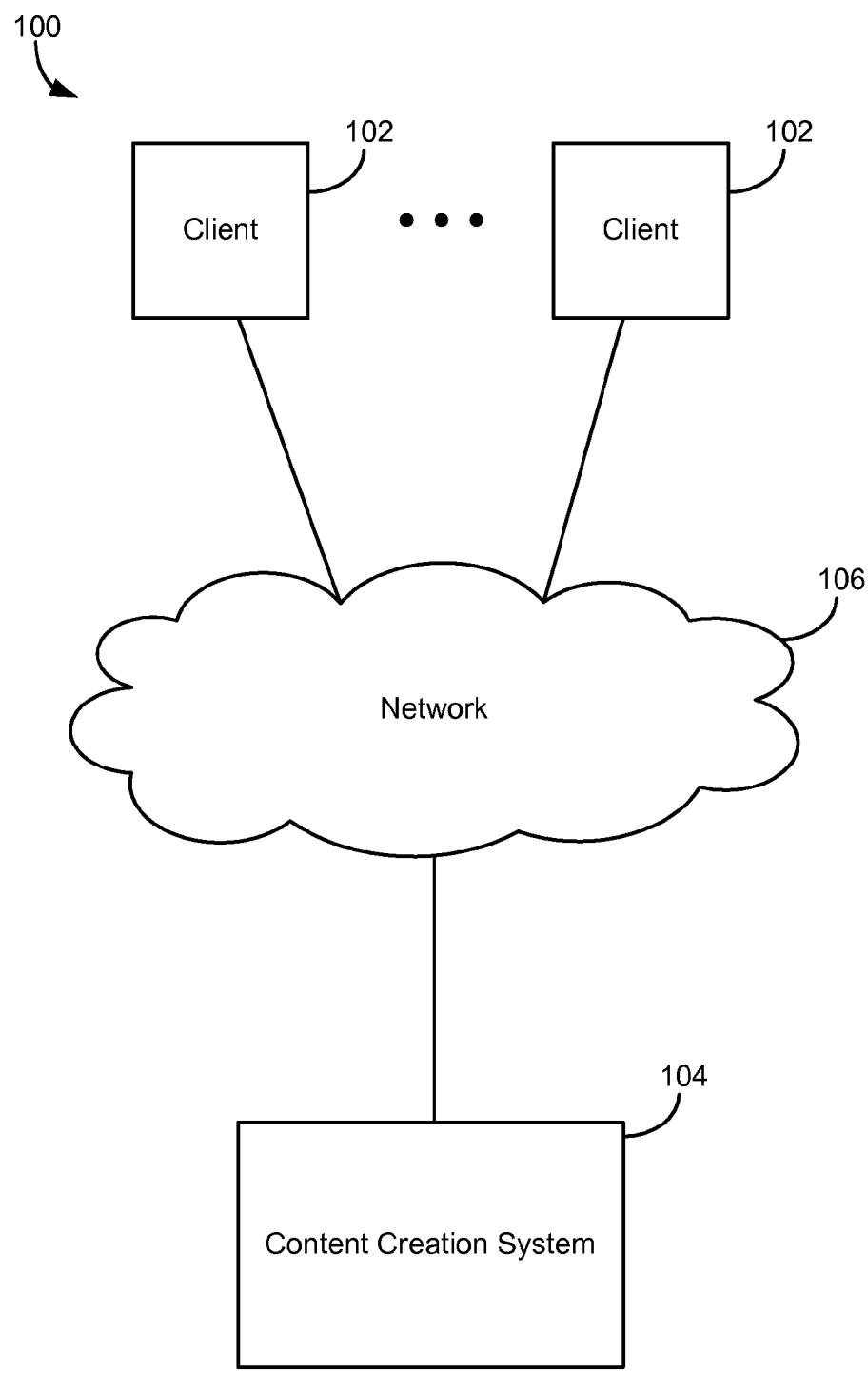
FIG. 1 is a block diagram illustrating a network, in accordance with some embodiments.

FIG. 1 is a block diagram illustrating a network, in accordance with some embodiments. The network 100 includes one or more clients 102, a content creation system 104, and a network 106 that interconnects these components. The network 106 may include one or more of the following: local area networks (LAN), wide area networks (WAN), intranets, wireless networks, and the Internet. The clients 102 may include, without limitation, personal computers (PC), network terminals, mobile phones, and personal digital assistants (PDA).

The content creation system 104 provides content creation services to users of clients 102. The content creation system 104 receives content created and submitted by users and communicates the content to others. Depending on the type of content, the content may be communicated in various ways. For example, emails may be communicated by delivering the emails to the intended recipient(s). Blog postings or comments may be posted to the destination blog, from which others may read the postings or comments. In some embodiments, the content creation system 104 may also provide content creation tools to users. Examples of such tools include, without limitation, email composition tools and blog comment authoring tools. These tools may range from simple online forms to script-based online applications. In some embodiments, the content that is created may be a document, which may be any machine-readable data that includes any combination of text, graphics, video, audio, etc. Examples of documents may include, without limitation, email messages, blog postings or comments, instant messages, messages posted to message boards or forums, messages posted to newsgroups, and messages posted to social networking sites. In some embodiments, the content creation system 104 includes one or more content creation servers 200, further details of which are described below in relation to FIG. 2.

Creators of documents interface with the content creation system via the clients 102. From the clients 102, creators can create documents and submit them to the content creation system 104 for sending or posting. In some embodiments, a client 102 includes one or more client applications through which users can create and submit documents to the content creation system 104. In some embodiments, the client 102 may include a web browser through which a user may access a web-based interface provided by the content creation server 104. The web-based interface provided by the content creation system 104 may include tools, such as email composition or message posting tools, for creating documents and submitting them to the content creation system 104 for sending or posting. In some other embodiments, the client applications may include standalone applications such as email applications, blog authoring applications, and instant messaging applications.

The creator of a document can be a human user or a software program acting as a software agent, a well known example of which is a "bot" (a term derived from the word "robot"). In some embodiments, a creator must establish an account with the content creation system 104 before being allowed to access the content creation system 104 and to submit content to the content creation system 104. The content creation system 104 may try to discourage bots from creating content for the content creation system 104, due to the association of bots with undesirable content such as spam. The content creation system 104, in order to determine if a creator is a human being or a bot, may present challenges to the creator, challenging the creator to prove that he (or it) is a human being.

Figure 2:
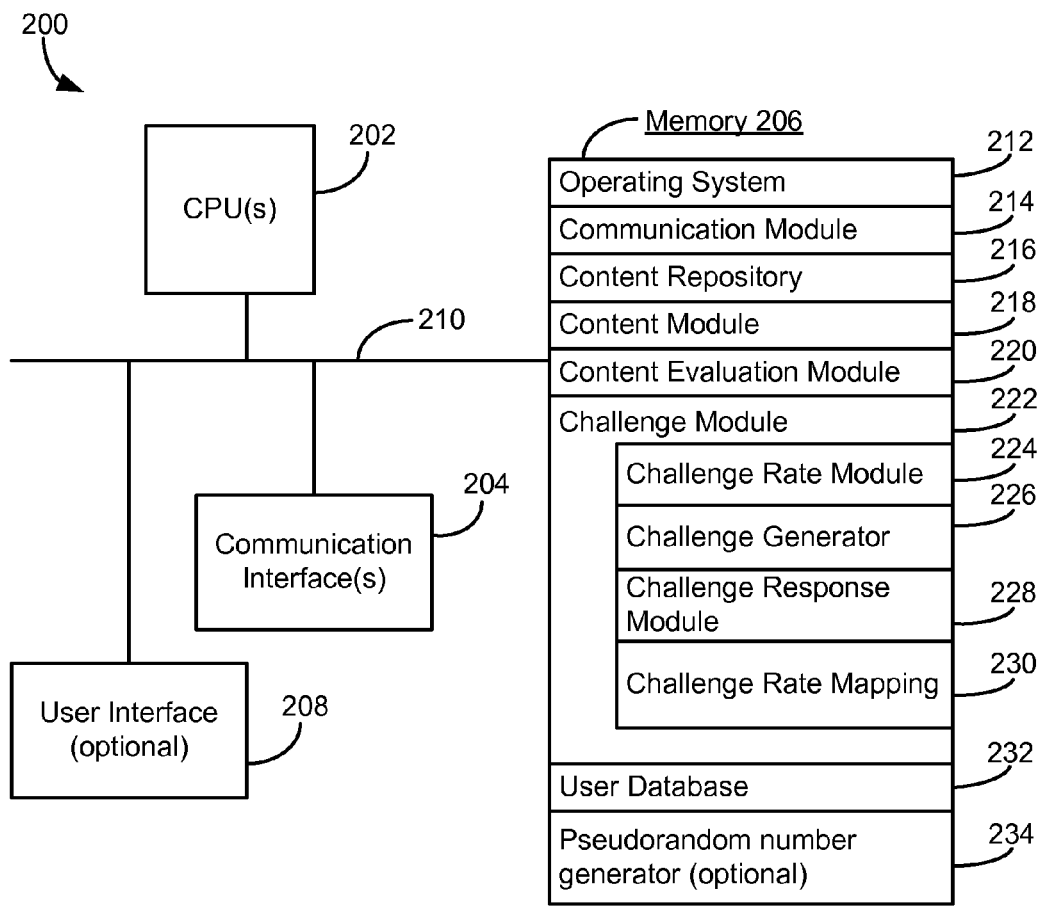
FIG. 2 is a block diagram illustrating a content creation server, in accordance with some embodiments.

FIG. 2 is a block diagram illustrating a content creation server 200, in accordance with some embodiments. The content creation server 200 typically includes one or more processing units (CPU's) 202, one or more network or other communications interfaces 204, memory 206, and one or more communication buses 210 for interconnecting these components. The communication buses 210 may include circuitry (sometimes called a chipset) that interconnects and controls communications between system components. The content creation server 104 optionally may include a user interface 208, e.g., a display device and a keyboard/mouse (not shown). Memory 206 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. In some embodiments, the memory 206 stores the following programs, modules and data structures, or a subset thereof:

- an operating system 212 that includes procedures for handling various basic system services and for performing hardware dependent tasks;
- a network communication module 214 that is used for connecting the content creation server 104 to other computers via the one or more communication network interfaces 204 (wired or wireless), such as the Internet, other wide area networks, local area networks, metropolitan area networks, and so on;
- a content repository 216 for storing documents;
- a content module (or set of instructions) 218 for receiving and processing documents;
- a content evaluation module (or set of instructions) 220 for evaluating documents and determining to what degree the documents include spam;
- a challenge module (or set of instructions) 222 for generating challenges, presenting challenges to document creators, and receiving and processing responses to challenges;
- a user database 232 for storing per-user data; and
- an optional pseudorandom number generator 234 for generating pseudorandom numbers used in the challenge generation process.

In some embodiments, the challenge module 222 includes a challenge rate module (or set of instructions) 224, a challenge generator (or set of instructions) 226, a challenge response module (or set of instructions) 228, and one or more challenge rate mappings 230. The challenge rate module (or set of instructions) 224 determines and adjusts rates or probabilities at which challenges are presented to creators of documents. The challenge generator (or set of instructions) 226 generates the challenges that are presented to creators. The challenge response module (or set of instructions) 228 receives and processes responses from creators to the challenges.

In some embodiments, the content evaluation module 220 determines a spam score (sometimes called a metric) for one or more documents created by a creator. The spam score represents a degree to which the evaluated document(s) have predefined characteristics associated with spam. The spam score may be mapped to a challenge rate by a challenge rate mapping 230, further details of which are described below in relation to FIG. 4.

In some embodiments, given a spam score (cumulative or otherwise), the challenge rate module 224 can determine the corresponding challenge rate by identifying in the challenge rate mapping 230 the spam score range into which the spam score falls and the corresponding challenge rate. In some other embodiments, given a spam score, the challenge rate module 224 may determine a challenge rate as a function of the spam score. The function may be a formula, the inputs of which include the spam score and possibly additional inputs and the output of which is the challenge rate.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a "content creation server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a content creation server and how features are allocated among them will vary from one implementation to another, and may depend in part on the amount of data traffic that the system must handle during peak usage periods as well as during average usage periods.

Figures 3, 4:
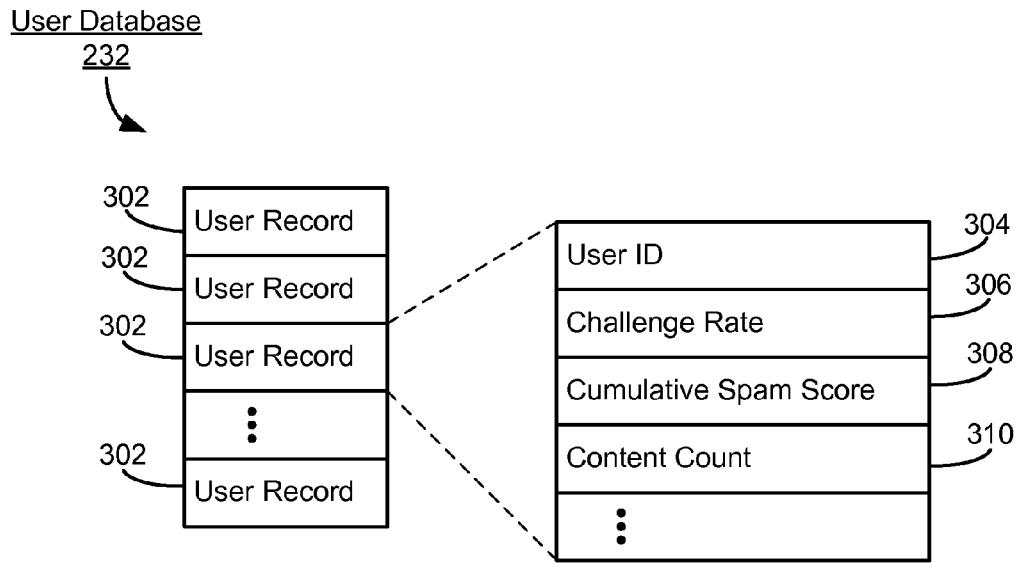
FIG. 3 is a block diagram illustrating a user database, in accordance with some embodiments.
FIG. 4 is a block diagram illustrating a challenge rate mapping, in accordance with some embodiments.

FIG. 3 is a block diagram illustrating a user database, in accordance with some embodiments. The user database 232 stores user records 302 containing per-user data associated with creators having accounts with the content creation system 104. A user record 302 may include an identifier assigned to a creator with which the user record is associated, such as a user ID 304. The user record 302 also may include a challenge rate 306 associated with that creator, and the cumulative spam score 308 for that creator. The user record 302 may optionally store additional related information, such as a content count 310. In other embodiments, the user record 302 may include a spam score or metric 308 but not a challenge rate 3060 (e.g., in these embodiments the challenge rate may be determined "on the fly," based on the spam score or metric). In yet other embodiments, the user record 302 may include a challenge rate 306 but not the spam score or metric (e.g., in these embodiments the spam score or metric may be computed periodically or episodically by evaluating documents stored in a database, and then mapped the spam score or metric to a challenge rate 306 that is stored in the user record 302).

The cumulative spam score 308 is the spam score for all documents created by the corresponding creator and stored in the content creation system 104 or the subset thereof that were created in a specified time period (e.g., within the last year or the last 6 months). In some embodiments, the cumulative spam score is a sum of the spam scores of individual documents (as determined by the content evaluation module 220) in the set of documents as described above. In some other embodiments, the cumulative spam score may be a mean or median of the spam scores of individual documents (as determined by the content evaluation module 220) in the set of documents as described above. In further other embodiments, the cumulative spam score may be a spam score for the documents evaluated as a whole by the content evaluation module 220. The cumulative spam score 308 may be used by the challenge rate module 224 to determine the challenge rate 306 for the corresponding creator.

The content count 310 is a count of the number of documents stored in the content repository 216 that were created by the corresponding creator. In some embodiments, when determining the challenge rate 306, the content count 310 may be used as an additional input in the determination of the challenge rate 306.

When a creator attempts to create a document, such as an email message or blog post, via tools provided by the content creation system 104, he may be presented a challenge to prove that he is a human being. The creator must pass the challenge before the document may be submitted to the content creation system 104 for sending or posting. The challenge is presented at a rate or probability specified by the challenge rate 306 associated with the creator. Further information regarding the challenge rate is described below, in relation to FIGS. 5A and 5B.

In some embodiments, the cumulative spam score 308, the content count 310, and the challenge rate 306 in a user record 302 may be updated at regular intervals (i.e., periodically), such as weekly. In some other embodiments, they are updated episodically, as new documents are created by the corresponding creator.

FIG. 4 is a block diagram illustrating a challenge rate mapping, in accordance with some embodiments. The challenge rate mapping 230 includes a plurality of spam score ranges 402. Each specified spam score range is mapped to a corresponding challenge rate 404. In some embodiments, determination of the challenge rate by the challenge rate module 224 involves looking in the mapping 230 for the spam score range into which a (cumulative) spam score falls and the challenge rate corresponding to that spam score range. As an example, spam scores ranging from 0 to 100 can be divided into 5 ranges. A first range of scores (e.g., 0-20) may correspond to a first challenge rate (e.g., 0%), a second range of scores (e.g., 21-40) may correspond to a second challenge rate (e.g., 10%), and so forth. In some embodiments, each of the spam score ranges 402 may be represented by a lower bound value (e.g., the lowest score in the applicable range) or by an upper bound value (e.g., the highest score in the applicable range).

Figure 5A:
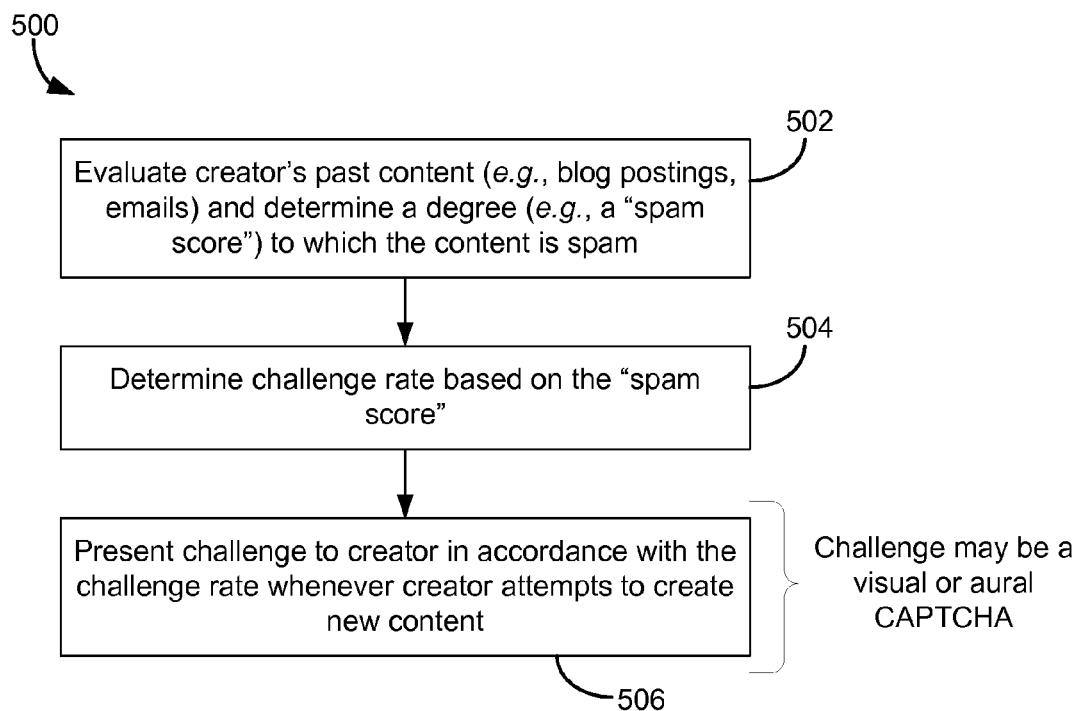
FIGS. 5A and 5B are flow charts illustrating processes for presenting challenges to a content creator and receiving a response to a challenge, in accordance with some embodiments.
Figure 5B:
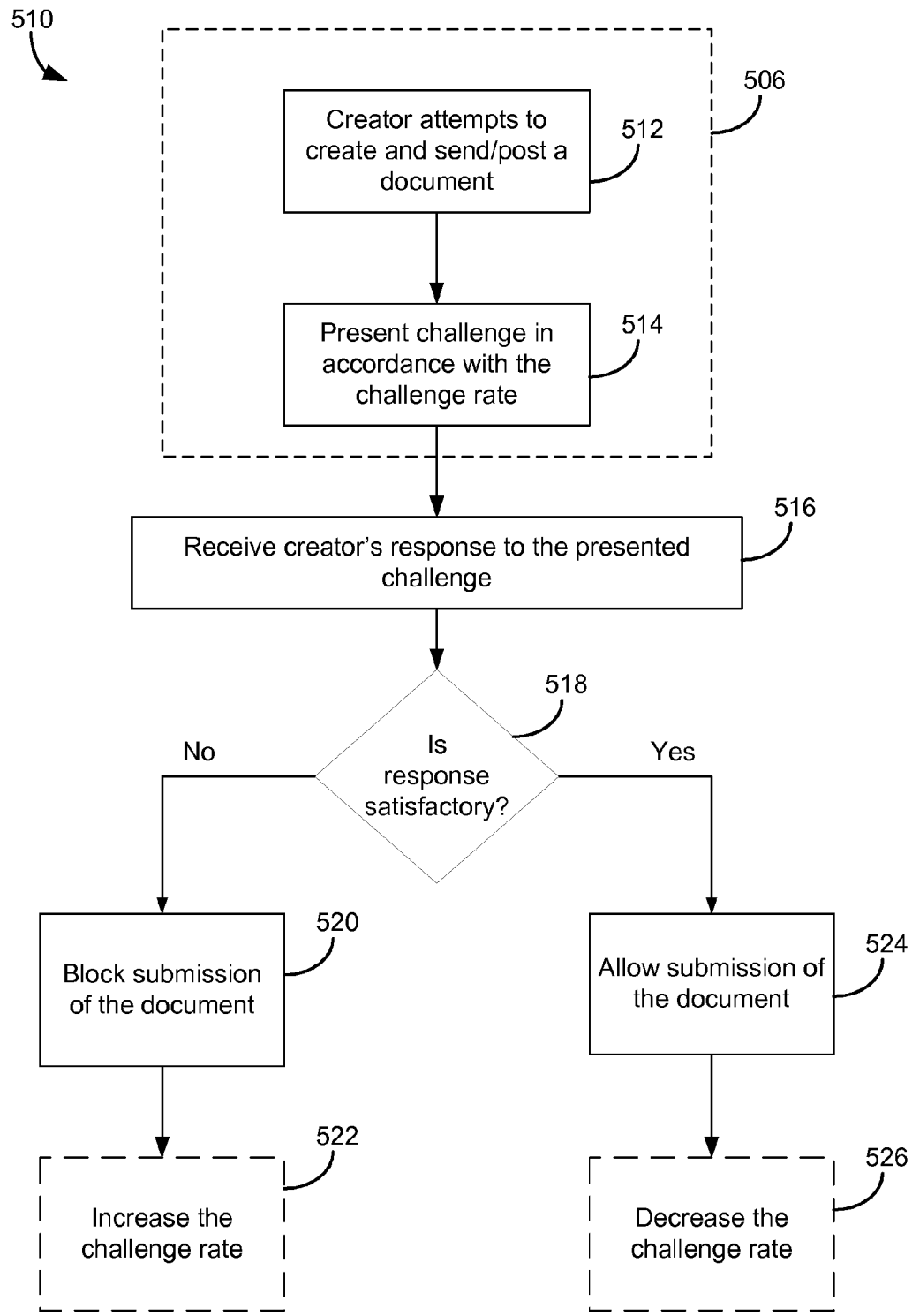

FIGS. 5A and 5B are flow charts illustrating processes for presenting challenges to a content creator and receiving a response to the challenge, in accordance with some embodiments. The challenge is presented to a creator when the creator attempts to create a document that he (or it) created, in order to verify that the creator is a human being. If the creator is determined to be human, the document is accepted by the content creation system 104 for sending or posting. If the creator is determined to be not human, then the document is rejected.

As used herein, a "challenge" includes any human interaction proof for determining whether the creator is a human being or a computer. A well-known example of a human-interaction proof is the "completely automated public Turing test to tell computers and humans apart" (CAPTCHA). The CAPTCHA technique involves the presentation of an automatically administered and graded test that a human should be able to pass but that a software program such as a bot should not be able to pass. The CAPTCHA may be visual (requiring reading of text, image recognition, or some other form of visual perception) or aural (requiring listening to speech, sound recognition, or some other form of aural perception). Examples of the "tests" used in CAPTCHAs include identification of visually distorted text or audibly distorted speech, and answering pattern recognition problems. Further information regarding the CAPTCHA technique is disclosed in U.S. Pat. No. 6,195,698, titled "Method for Selectively Restricting Access to Computer Systems;" and in Ahn et al., "Telling Humans and Computers Apart Automatically," *Communications of the ACM*, February 2004, pp. 57-60; the disclosures of which are hereby incorporated by reference in their entirety as background information.

In process flow 500, documents that have been created by a creator and stored in the content creation system 104 are evaluated with regard to the degree to which the documents include spam (502). The set of documents that is evaluated may be all of the of documents that were created by the creator and stored in the content repository 216 or only a subset thereof that were created within a specified time period, e.g., within the past year or 6 months and stored in the content repository 216. The evaluation determines whether the content includes spam and to what degree the content includes spam by spam detection techniques that are well known in the art, such as scanning the document for prominence of words commonly associated with spam or analyzing the rate at which the set of documents were submitted. Examples of spam detection techniques are disclosed in U.S. Pat. No. 6,161,130, titled "Technique which Utilizes a Probabilistic Classifier to Detect "Junk" E-Mail by Automatically Updating a Training and Re-training the Classifier Based on the Updated Training Set;" and U.S. Patent Application Publication No. 2005/0262210, titled "Email Analysis Using Fuzzy Matching of Text," the disclosures of which are hereby incorporated by reference.

In some embodiments, the documents in the set are evaluated individually and spam scores for the individual documents are determined and added to yield a cumulative spam score for the set of documents. In some other embodiments, the set of documents is evaluated as a whole and a cumulative spam score is determined for the set as a whole.

The cumulative spam score represents a degree to which the documents are determined to include spam. Alternately (and in some instances, equivalently), the cumulative spam score represents the extent to which the documents have predefined characteristics associated with spam. In some embodiments, the cumulative spam score is on a 0 to 100 scale, with a higher score indicating that the documents are more likely to include spam or to have predefined characteristics associated with spam. In some other embodiments, alternative score scales and formats, such as a 1-to-5 scale or letter grading, are possible.

A challenge rate is determined based on the cumulative spam score (504). The challenge rate is a rate or probability at which a challenge will be presented to the creator whenever the creator attempts to create a document. In some embodiments, the challenge rate may be expressed as a percentage or an equivalent probability. For example, a challenge rate of 0.65 indicates that a challenge may be presented to the creator at a likelihood of 65%. In some other embodiments, the challenge may be expressed as an average number of challenges that are to be presented per some number of documents. For example, a rate of 3/14 (0.214 after rounding to the nearest thousandth) indicates an average rate of 3 challenges to be presented per 14 attempts to send a document to the content creation system.

In some embodiments, the challenge rate may be determined by looking up a mapping of spam score ranges to challenge rates, such as the mapping 230 described with respect to FIG. 4 above. In some other embodiments, the challenge rate may be determined by applying an equation in which the spam score is an input. For example, a challenge rate equation may be:

$$R = \frac{\alpha S}{C} + \beta$$

where R is the challenge rate, S is the cumulative spam score, C is the content count (number of documents based on which the cumulative spam score S is determined), and $\alpha$ and $\beta$ are predefined constants.

In some embodiments, the cumulative spam score S may be weighted based on the number of documents on which the cumulative spam score is based. Thus, a spam score that is determined from a set of 100 documents may be weighted more heavily than a spam score that is determined from a set of 19 documents. This weighting gives more credence to spam scores, and thus to challenge rates, that are based on larger document sample sizes.

It should be appreciated, however, that the manner of determining the challenge rate described above is merely exemplary. Alternative manners of determining the challenge rate are possible.

Figure 6A:
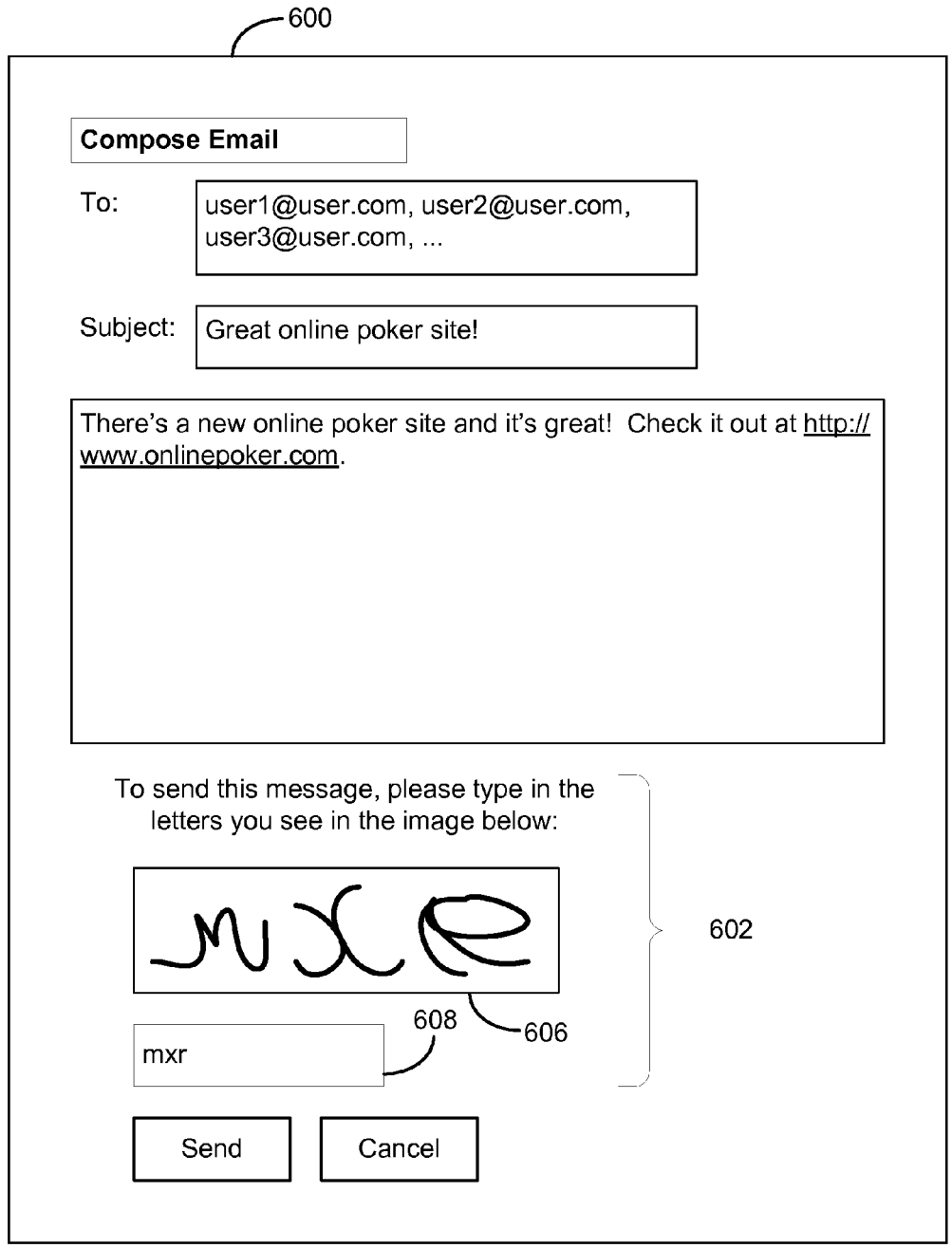
FIGS. 6A and 6B illustrate examples of challenges presented to a creator of an email and a blog comment, in accordance with some embodiments.
Figure 6B:
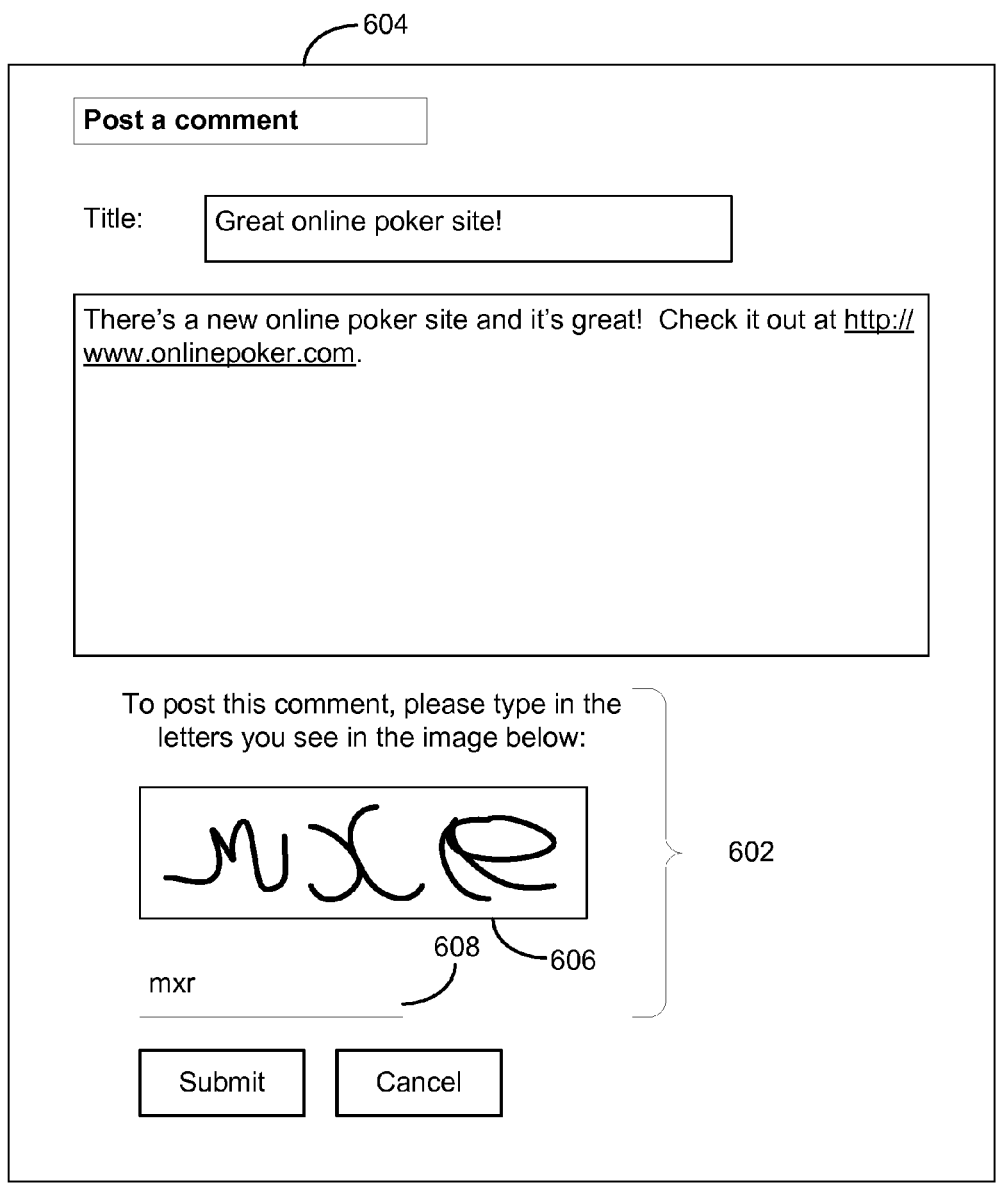

Whenever a creator attempts to create a document, a challenge may be presented to the creator (506). Examples of presented challenges are shown in FIGS. 6A and 6B, described below. The challenge is presented in accordance with the challenge rate associated with that creator. That is, the challenge rate controls whether a challenge is presented or not in any particular instance in which the creator attempts to create a document.

In some embodiments, whether a challenge is presented is based on the challenge rate (expressed as a percentage or probability) and numbers generated by a pseudorandom number generator. For example, if the challenge rate is 30% (a probability of 0.30), then the pseudorandom number generator generates a number between 0 and 1.00, inclusive. If the number falls in the range between 0 and 0.30, inclusive, then a challenge is presented. If the number falls outside of this range, then a challenge is not presented. More generally, if a pseudo-randomly generated number falls within a range associated with the challenge rate, then a challenge is presented, and otherwise (when the pseudo-randomly generated number falls outside that range) a challenge is not presented.

If the challenge rate is an average rate at which the challenges are to be presented, the content creation system may randomly or pseudo-randomly present the challenges to the creator at the determined rate. For example, if the rate is 3 challenges per 14 document creation attempts, the challenges may be presented randomly within groups of 14 document creation attempts. The attempts within the 14 document creation attempts for which challenges will be presented may be randomly or pseudo-randomly selected in advance, or they may be randomly or pseudo-randomly selected in real time, as the creator makes the document creation attempts.

Process flow 510 (FIG. 5B) illustrates further the challenge presentation process and also illustrates the process flow for dealing with a response to the challenge. A creator initiates an attempt to create a document (512), e.g. by clicking on a "Compose Email" button or link in a webmail application or clicking on a "Post a Comment" link in a blog. That loads up a document composition window, such as an email composition window a blog comment composition form, respectively. A challenge may be presented in the document composition window in accordance with the creator's challenge rate, as described above (514). The challenge may be displayed in the document composition window, if the challenge is visual. Examples of challenges presented in the document composition window are illustrated in FIGS. 6A and 6B, described below. If the challenge is aural, the challenge may be presented after the creator clicks a "Send" button, "Post" button, "Submit" button, or the like, to submit the document to the content creation system 104 for sending or posting. The creator is alerted that he must pass the challenge before the document will be sent or posted.

The creator responds to the challenge and the response is received (516). If the response successfully answers the challenge (518—yes), then the document is submitted to the content creation system 104 (524). Optionally, the challenge rate may be decreased (526). That is, the creator is less likely to be presented a challenge in future document creation attempts. The successful passage of the challenge suggests that the creator is more likely a legitimate user than an automated spam bot; thus the creator is rewarded with a smaller likelihood of being presented a challenge in the future.

If the response unsuccessfully answers the challenge (518—no), then the sending or posting of the document is blocked (520). Optionally, the challenge rate may be increased (522). That is, the creator is more likely to be presented a challenge in future document creation attempts. The unsuccessful passage of the challenge suggests that the creator is more likely an automated spam bot than a legitimate user; thus the creator is penalized with a higher likelihood of being presented a challenge in the future.

It should be appreciated that additional actions may be taken in response to a successful or unsuccessful response to a challenge. For example, the content creation system may track the number of consecutive unsuccessful response to challenges by a creator, a number that is reset whenever the creator successfully responds to a challenge and breaks the streak. If the number of consecutive unsuccessful challenge responses reaches a threshold, the creator may be given a warning, or suspended or banned from the content creation system.

In some embodiments, the creator may be automatically presented a challenge, independent of the challenge rate, after an unsuccessful challenge response which starts a new streak of failed challenges. Thus, for example, if a creator attempts to send an email message and fails (i.e., responds unsuccessfully to) the challenge for that attempt, he may be presented a challenge in the next attempt, even if the challenge rate is 0. In other words, if the number of consecutive unsuccessful challenge responses is greater than 0, the creator is guaranteed to be presented a challenge, regardless of the challenge rate, until the creator passes a challenge, resetting the number of consecutive unsuccessful challenge responses to 0.

FIGS. 6A and 6B illustrate examples of challenges presented to a creator of an email and a blog comment, respectively, in accordance with some embodiments. FIG. 6A shows an email composition window 600. The composition window includes a challenge 602, in this case a visual CAPTCHA involving identification of visually distorted text 606. A text box 608 is also included for typing in the response. The creator, the author of the email message, is asked to type the visually distorted text into the text box 608 before clicking the "Send" button to send the email. If the text typed into the text box 608 correctly identifies the text shown in the CAPTCHA 606, then the email is sent. If the typed text incorrectly identifies the CAPTCHA text, then the email is not sent.

Similarly, FIG. 6B shows a blog comment composition window 604. The window 604 also includes a CAPTCHA challenge 602, asking the creator to identify visually distorted text 606. The response may be entered into text box 608. The creator of the blog comment is asked to type the visually distorted text into the text box 608 before clicking the "Submit" button to post the comment to the blog. If the text typed into the text box 608 correctly identifies the text shown in the CAPTCHA 606, then the comment is posted to the blog. If the typed text incorrectly identifies the CAPTCHA text, then the comment is not posted to the blog.

It should be appreciated, however, that while the challenges in the embodiments described above are described as CAPTCHAs, any human interaction proof for telling humans and computers apart may be used as the challenge, whether or not it is a CAPTCHA.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of controlling spam, comprising:
    on a server system having one or more processors that execute programs stored in memory of the server system:
    determining, for a set of documents created by a creator, a metric whose value indicates an extent to which the set of documents includes spam, wherein the value is on a predefined scale and wherein determining the metric for the set of documents comprises determining at least one spam score for the set of documents;
    determining a challenge rate associated with the creator based on the determined metric whose value indicates the extent to which the set of documents includes spam, wherein the challenge rate is less than one hundred percent and wherein determining the challenge rate comprises determining the challenge rate associated with the creator based on the at least one spam score; and
    presenting to the creator a challenge in accordance with the challenge rate whenever the creator attempts to create a document.

2. The method of claim 1, wherein the challenge comprises a completely automated public Turing test to tell computers and humans apart (CAPTCHA).

3. The method of claim 1, wherein the set of documents comprises weblog postings.

4. The method of claim 1, wherein the set of documents comprises email messages.

5. The method of claim 1, further comprising:
    receiving a response of the creator to the challenge; and
    adjusting the challenge rate based on the response.

6. The method of claim 1, wherein the challenge rate represents a probability greater than 0 percent.

7. A system for controlling spam, comprising:
    memory;
    one or more processors; and
    one or more modules stored in the memory and configured for execution by the one or more processors, the modules comprising:
    instructions to determine, for a set of documents created by an creator, a metric whose value indicates an extent to which the set of documents includes spam, wherein the value is on a predefined scale and wherein the instructions to determine the metric comprise include instructions to determine at least one spam score for the set of documents;
    instructions to determine a challenge rate associated with the creator based on the determined metric whose value indicates the extent to which the set of documents includes spam, wherein the challenge rate is less than one hundred percent and wherein the instructions to determine the challenge rate comprise instructions to determine the challenge rate associated with the creator based on the at least one spam score; and
    instructions to present to the creator a challenge in accordance with the challenge rate whenever the creator attempts to create a document.

8. The system of claim 7, wherein the challenge comprises a CAPTCHA.

9. The system of claim 7, wherein the one or more modules comprise:
    instructions to receive a response of the creator to the challenge; and
    instructions to adjust the challenge rate based on the response.

10. The system of claim 7, wherein the challenge rate represents a probability greater than 0 percent.

11. A computer-implemented method of controlling spam, comprising:
    determining, for a set of documents created by a creator, a metric whose value indicates an extent to which the set of documents have characteristics associated with spam, wherein determining the metric for the set of documents comprises determining at least one spam score for the set of documents;
    determining a challenge rate associated with the creator based on the determined metric, wherein the challenge rate is less than one hundred percent and wherein determining the challenge rate comprises determining the challenge rate associated with the creator based on the at least one spam score; and
    presenting to the creator a challenge in accordance with the challenge rate whenever the creator attempts to create a document.

12. The method of claim 11, wherein the challenge rate represents a probability greater than 0 percent.

13. A computer readable storage medium storing one or more programs for execution by one or more processors of a computer systems, the one or more programs comprising instructions for:
    determining, for a set of documents created by an creator, a metric whose value indicates an extent to which the set of documents includes spam, wherein the value is on a predefined scale and wherein determining the metric for the set of documents comprises determining at least one spam score for the set of documents;
    determining a challenge rate based on the determined metric whose value indicates the extent to which the set of documents includes spam, wherein the challenge rate is less than one hundred percent and wherein determining the challenge rate comprises determining the challenge rate associated with the creator based on the at least one spam score; and presenting to the creator a challenge whenever the creator attempts to create a document in accordance with the challenge rate.

14. The computer readable storage medium of claim 13, wherein the instructions further comprise instructions for:

receiving a response of the creator to the challenge; and adjusting the challenge rate based on the response.

15. The computer readable storage medium of claim 13, wherein the challenge rate represents a probability greater than 0 percent.

16. A system for controlling spam, comprising:

one or more processors;

memory storing one or more programs to be executed by the one or more processors;

means for determining, for a set of documents created by a creator, a metric whose value indicates an extent to which the set of documents includes spam, wherein the value is on a predefined sale and wherein the means for determining the metric for the set of documents comprises means for determining at least one spam score for the set of documents;

means for determining a challenge rate based on the determined metric whose value indicates the extent to which the set of documents includes spam, wherein the challenge rate is less than one hundred percent and wherein the means for determining the challenge rate comprises means for determining the challenge rate associated with the creator based on the at least one spam score; and means for presenting to the creator a challenge whenever the creator attempts to create a document in accordance with the challenge rate.

17. The system of claim 16, wherein the challenge rate represents a probability greater than 0 percent.

* * * * *

UNITED STATES PATENT AND TRADEMARK OFFICE
CERTIFICATE OF CORRECTION

| | | |
|---|---|---|
| PATENT NO. | : 7,680,891 B1 | Page 1 of 1 |
| APPLICATION NO. | : 11/425118 | |
| DATED | : March 16, 2010 | |
| INVENTOR(S) | : John Pongsajapan | |

It is certified that error appears in the above-identified patent and that said Letters Patent is hereby corrected as shown below:

Column 10, line 10, please delete "an creator," and insert -- a creator, --.

Column 10, line 60, please delete "an creator," and insert -- a creator, --.

Signed and Sealed this

Eighteenth Day of May, 2010

David J. Kappos
*Director of the United States Patent and Trademark Office*